US007280813B2

(12) United States Patent
Elliott et al.

(10) Patent No.: US 7,280,813 B2
(45) Date of Patent: Oct. 9, 2007

(54) VARIABLE DELAY RADIO RECEIVER

(75) Inventors: Peter Fortier Elliott, 314 Myrtle St., Redwood City, CA (US) 94062; Earl William McCune, Jr., Santa Clara, CA (US)

(73) Assignee: Peter Fortier Elliott, Redwood City, CA (US)

( * ) Notice: Subject to any disclaimer, the term of this patent is extended or adjusted under 35 U.S.C. 154(b) by 218 days.

(21) Appl. No.: 10/389,729

(22) Filed: Mar. 13, 2003

(65) Prior Publication Data

US 2004/0180641 A1 Sep. 16, 2004

(51) Int. Cl.
*H04B 1/18* (2006.01)

(52) U.S. Cl. .............................. 455/243.1; 455/178.1; 455/181.1; 455/242.1

(58) Field of Classification Search ............. 455/243.1, 455/178.1, 242.1, 296, 272.1, 272.2, 501, 455/63, 242.2, 179.1, 181.1, 246.1, 277.1, 455/130, 132; 348/485, 738, 729, 515, 465, 348/462, 553; 725/109–111
See application file for complete search history.

(56) References Cited

U.S. PATENT DOCUMENTS

| 4,313,135 A | * | 1/1982 | Cooper | 348/512 |
|---|---|---|---|---|
| 4,348,754 A | | 9/1982 | Haynes et al. | 369/60 |
| RE33,535 E | * | 2/1991 | Cooper | 348/512 |
| 5,157,728 A | | 10/1992 | Schorman et al. | 381/33 |
| 5,570,372 A | | 10/1996 | Shaffer | |
| 5,894,523 A | | 4/1999 | Freeman | 381/95 |
| 6,148,008 A | | 11/2000 | Okamoto | 370/486 |
| 6,178,317 B1 | | 1/2001 | Kroeger et al. | 455/296 |
| 6,285,405 B1 | * | 9/2001 | Binford et al. | 348/512 |
| 6,380,981 B1 | | 4/2002 | Kasezawa et al. | |
| 6,630,963 B1 | * | 10/2003 | Billmaier | 348/485 |
| 2002/0007371 A1 | | 1/2002 | Bray | |
| 2002/0013949 A1 | * | 1/2002 | Hejna, Jr. | 725/100 |
| 2002/0103919 A1 | | 8/2002 | Hannaway | |
| 2002/0174440 A1 | * | 11/2002 | Usuba et al. | 725/110 |

OTHER PUBLICATIONS

PCT/US04/06167 International Search Report, mailed May 4, 2006, International filing date, Jan. 3, 2004.

* cited by examiner

*Primary Examiner*—Pablo N. Tran
(74) *Attorney, Agent, or Firm*—Thelen Reid Brown Raysman & Steiner LLP

(57) ABSTRACT

A radio comprises a receiver and a variable delay circuit. The receiver generates an electrical signal. The variable delay circuit delays the electrical signal by a variable delay time and outputs a delayed electrical signal. The variable delay time is manually adjusted to correspond the delayed electrical signal with a display from an external audio and video receiver.

21 Claims, 3 Drawing Sheets

FIG. 1 - PRIOR ART

VARIABLE DELAY RADIO RECEIVER

FIELD OF THE INVENTION

The present invention relates to an apparatus for receiving broadcasting signals. More particularly, the present invention relates to a variable delay receiver system.

BACKGROUND OF THE INVENTION

The timing of broadcast signals received by televisions and radios depends on the medium through which the signals are sent. For example, a person listening to the audio of a local radio broadcasting a live event while watching the live event on his television with the television sound off may be confused because of the delay between the television and the radio. Due to differences between radio and television transmission delays, attempting to listen to a local radio broadcast coverage of a live event while simultaneously watching the same live event on cable or satellite television (with the television audio off) is an annoying and confusing experience.

FIG. 1 is a schematic illustrating the above problem. A live event 102, such as a sporting event, is being televised at block 104 and broadcasted through a local radio 106. The television coverage of the live event 102 may be transmitted using several means: over-the-air broadcast 108, cable broadcast 110, and satellite broadcast 112. Eventually, a television receiver 114 receives the video and audio feed of the live event 102. However, the different means of transmissions 108, 110, 112 also result in different reception time. For example, the signal "bouncing off" a satellite 112 may create about a 3 second delay between the live event 102 and the broadcast coverage of the live event 102 received on the television receiver 114. On the other hand, the cable broadcast delay may be shorter than the satellite broadcast delay.

The transmission feed of the radio broadcast 106 over-the-air 116 may reach a radio receiver 118 at the same residence 120 of the television receiver 114 approximately a few seconds after the radio signals are broadcast. Therefore, the audio from the radio receiver 118 may not match the video of television receiver 114 because of the different delays involved in the different means of transmissions.

Therefore, a need exists for a radio receiver having variable delay capability so that the audio from a radio broadcast of a live event matches with the video from a television displaying the live event.

BRIEF DESCRIPTION OF THE INVENTION

A radio comprises a receiver and a variable delay circuit. The receiver generates an electrical signal. The variable delay circuit delays the electrical signal by a variable delay time and outputs a delayed electrical signal. The variable delay time is manually adjusted to correspond the delayed electrical signal with a display from an external audio and video receiver.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a variable delay radio receiver. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

Figure 1:
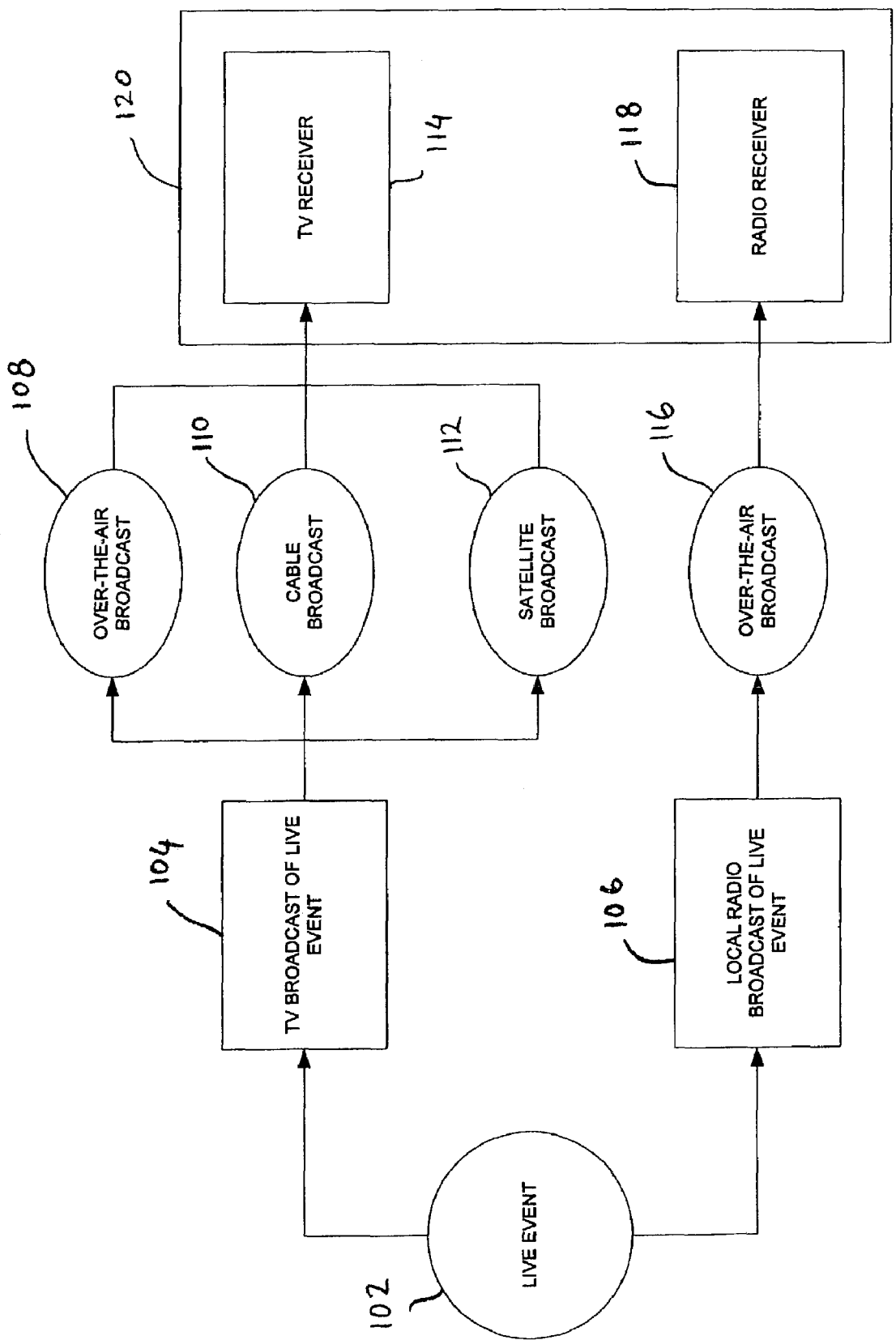
FIG. 1 is a diagram schematically illustrating the different means of broadcasting a live event in accordance with a prior art.
Figure 2:
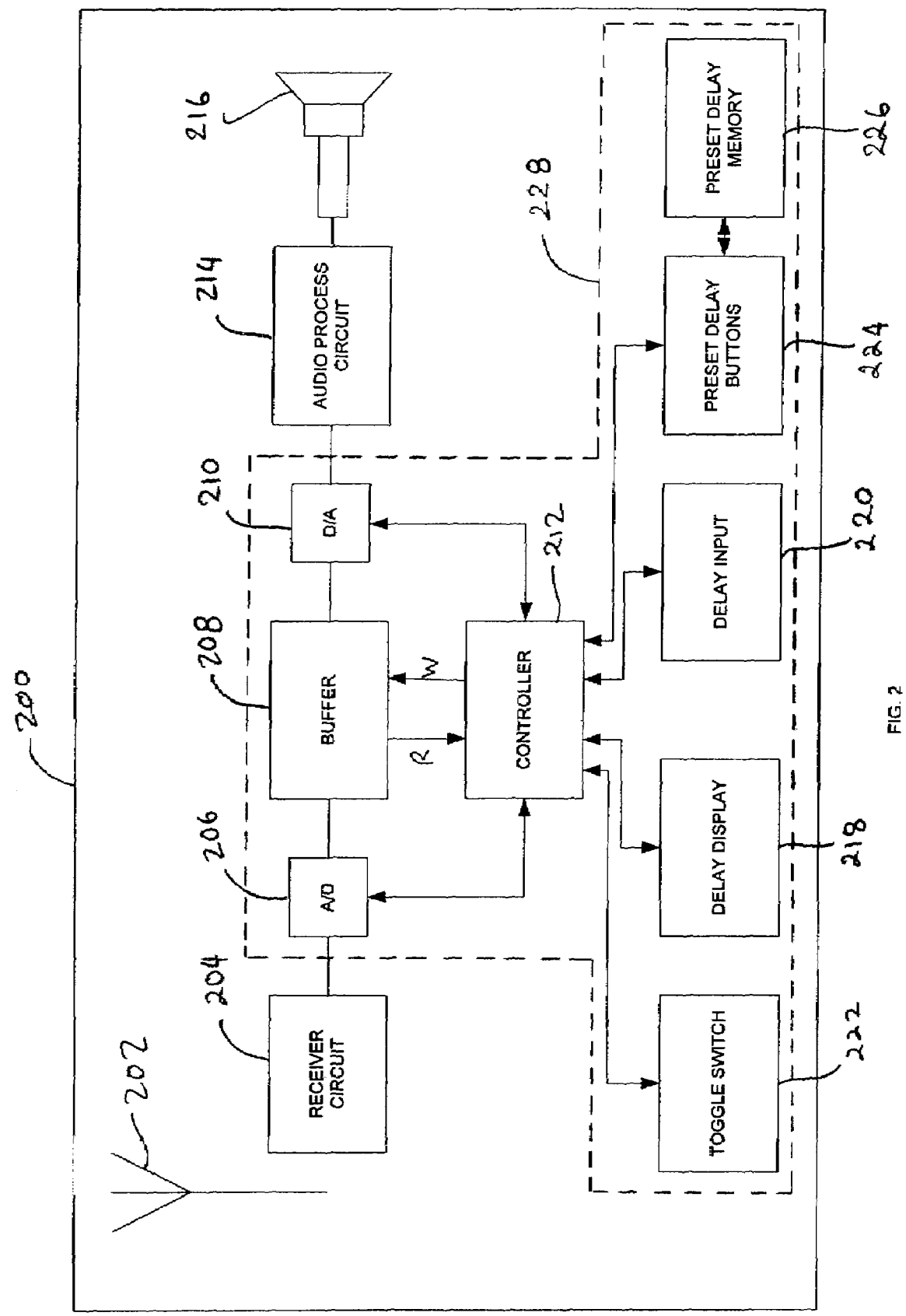
FIG. 2 is a diagram schematically illustrating a variable delay radio receiver in accordance with one embodiment of the present invention.

FIG. 2 illustrates a variable delay radio receiver 200 in accordance with one embodiment of the present invention. The radio 200 includes an antenna 202 for receiving radio signals of a local radio broadcast of a live event. A conventional receiver circuit 204 processes the received radio signals and produces an electrical signal representing the audio of the local radio broadcast of the live event. The electrical signals produced by the receiver circuit 204 are fed into an analog-to-digital (A/D) converter 206, for producing a digital signal at an input rate set by a controller 212 (e.g., a microprocessor, a digital signal processor, and the like). The digital signal is then sampled by the controller 212 and stored in a conventional circular buffer 208 that may comprise a memory such as an SDRAM. The controller 212 also causes the buffer 208 to sample and store the input signal (at an input rate), and provides an input rate clock signal to the analog-to-digital (A/D) converter 206, and an output rate clock signal to a digital-to-analog (D/A) converter 210. Those of ordinary skills in the art will recognize that the A/D converter 206 may also include proper anti-aliasing filter and the D/A converter 210 may also include a proper reconstruction filter. The clock signals from the controller 212 set the input and output rates of the buffer 208.

Moreover, the controller 212 controls the memory address of the buffer 208 to cause successive samples to be stored (W) in an increasing address of memory. Additionally, the controller 212 controls a similar process to read (R) samples from the buffer 208 to produce a digital audio signal. The digital audio signal read from the buffer 208 is converted to a restored analog signal with the D/A converter 210. The restored analog signal is then processed by a conventional audio circuit 214 and fed to a speaker 216. The rate at which the digital audio signals are read from the buffer 208 and converted to analog form, with the D/A converter 210, is controlled by the controller 212. In particular, the controller 212 can offset the read (R) address from the write (W) address of the audio stored in the buffer 208, to produce a controllable variable delay.

In accordance with one embodiment, the variable delay receiver 200 also includes a delay display 218 for displaying the time delay, a delay input 220 for controlling the variable delay, and a toggle switch 222 for switching on or off the delay feature of the variable delay radio receiver 200. The delay display 218, delay input 220, and the toggle switch 222 are all coupled to controller 212. The delay display 218 may include, for example, a digital display of the time delay in milliseconds. One of ordinary skill will recognize that the display 218 may also include analog displays, and other types of displays.

The delay input 220 may include an analog input or digital input. For example, the analog input may be in the form of a dial knob and the digital input may be in the form of one button (not shown) for increasing the time delay and another button (not shown) for decreasing the time delay.

The toggle switch 222 may be coupled to the controller 212 for allowing a user to turning on or off the time delay feature of the radio receiver 200. In accordance with one embodiment, when the user switches off the delay feature off, the receiver circuit 204 is directly coupled to the audio process circuit 214, bypassing the A/D 206, buffer 208, D/A 210.

In accordance with another embodiment, the buffer 208 may be implemented with a moving magnetic tape and fixed heads, fixed tape and moving heads, a combination thereof, or a random access memory (RAM) with a read address and a write address. The reading (R) and writing (W) processes in the buffer 208 can be controlled by read and write controllers (not shown), which could be advanced at the same rate, at different rates or either one or both can be stopped. The read and write controllers may be included in the controller 212. The distance between the write and read positions, expressed in time, represents the time delay in the received broadcast of the local radio by the buffer 208 from the time that the sound was stored (i.e., written) in the buffer 208. For example, a tape moving at a rate of 10 inches/sec., with heads one inch apart will have a delay of 100 ms. The delay may also be known as the buffer length. The maximum buffer length of a memory is the total number of samples it can hold divided by the sample rate (e.g., 1.0 Megabyte/10, 000 samples/sec×1 sample/byte=100 sec.). The complete control over the present positions of the read and write pointers and over the rate at which they advance allows for a variable-length buffer that may be controlled by the delay input 220. Depending on the accuracy needed, the increment of the time delay input 220 may vary accordingly (for example, one tenth of a second, one hundredth of a second, etc . . . ).

In accordance with another embodiment of the present invention, the variable delay radio receiver 200 may also include another memory 226 for storing the listener-set time delay for a corresponding station and preset buttons 224. The preset delay memory 226 may be coupled to the preset delay buttons 224. The preset delay buttons 224 may also be coupled to the controller 212. A listener may later retrieve the variable time delay previously set for corresponding radio stations.

FIG. 2 illustrates a variable delay radio receiver in accordance with one embodiment. In accordance with another embodiment, FIG. 2 also illustrates a variable delay module 228. In particular, the variable delay module 228 may also include the A/D converter 206, the memory buffer 208, the D/A converter 210, the toggle switch 222, the delay display 218, the delay input 220, the preset delay buttons 224, which are all coupled to a controller 212. The variable delay module 228 may further include a preset delay memory 226 coupled to the preset delay buttons 224. Those of ordinary skill in the art will recognize that the variable delay module 228 may be implemented with the radio receiver as discussed above, other audio receiver, and the like.

Figure 3:
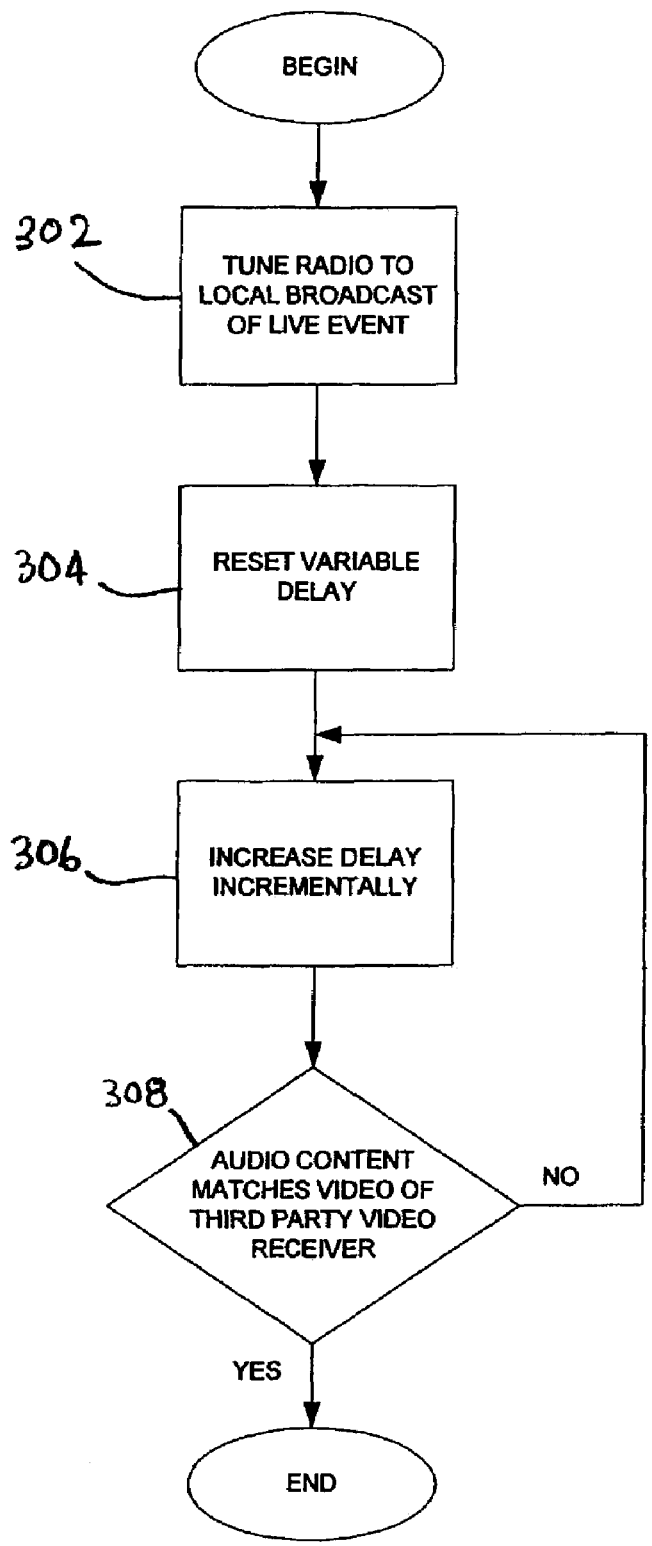
FIG. 3 is a diagram schematically illustrating a method for matching the audio broadcast of a live event of a variable delay receiver with the video broadcast portion of the live event of a television in accordance with one embodiment of the present invention.

FIG. 3 illustrates a method of using the variable delay radio receiver in accordance with one embodiment of the present invention. At 302, a listener watching a live event on his television tunes the variable delay radio receiver to a local station broadcasting the same live event. Both television and radio receiver are located at the same residence. Once the listener resets the variable delay to zero at 304, the listener increases incrementally the time delay at 306 via the delay input. The listener checks whether the content of the audio matches the video of a television at the same residence at 308 as the time delay varies. If the video of the television still lags behind the audio of the radio, the listener again increases the variable time delay at 306.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A radio comprising:
   a receiver generating an audio signal from a first incoming signal; and
   a variable delay circuit for delaying said audio signal by a variable delay time and outputting a delayed audio signal,
   wherein said variable delay time is manually adjusted to synchronize said delayed audio signal with a video displayed from an external audio and video receiver receiving a second incoming signal associated at least with the video being displayed, wherein the first incoming signal is received by the receiver prior to the second incoming signal being received by the external audio and video receiver.

2. The radio according to claim 1 further comprising:
a speaker coupled to said variable delay circuit for receiving said delayed audio signal and for generating an output audio signal audible to a user corresponding to said delayed electrical signal.

3. The radio according to claim 1 wherein said variable delay circuit further comprises:
an analog-to-digital (A/D) converter for digitizing said audio signal into a digital signal;
a memory for temporarily storing said digital signal;
a controller reading said digital signal at said variable delay time thereafter, and generating a delayed digital signal; and
a digital-to-analog (D/A) converter for converting said delayed digital signal to said delayed electrical signal.

4. The radio according to claim 1 further comprising a variable delay indicator coupled to said variable delay circuit for displaying said variable delay time.

5. The radio according to claim 1 further comprising a variable delay selector coupled to said variable delay circuit for allowing a user to manually adjust said variable delay time.

6. The radio according to claim 5 wherein said variable delay selector includes an analog input.

7. The radio according to claim 5 wherein said variable delay selector includes a digital input.

8. The radio according to claim 1 further comprising:
a memory coupled to said variable delay circuit for storing a plurality of variable delay times; and
a plurality of preset buttons coupled to said memory, said plurality of preset buttons corresponding to said plurality of variable delay times.

9. The radio according to claim 1 further comprising a variable delay time switch for activating or deactivating said variable delay circuit.

10. A receiver delay module comprising:
a variable delay circuit for delaying an audio signal received by an audio receiver by a variable delay time and outputting a delayed audio signal,
wherein said variable delay time is manually adjusted to synchronize said delayed audio signal with a video signal displayed by an external audio and video receiver, wherein the audio signal is received by the audio receiver prior to the video signal being displayed by the external audio and video receiver.

11. The receiver delay module according to claim 10 wherein said variable delay circuit further comprises:
an analog-to-digital (A/D) converter for digitizing said audio signal into a digital signal;
a memory for temporarily storing said digital signal;
a controller reading said digital signal at said variable delay time thereafter, and generating a delayed digital signal; and
a digital-to-analog (D/A) converter for converting said delayed digital signal to said delayed electrical signal.

12. The receiver delay module according to claim 10 further comprising a variable delay indicator coupled to said variable delay circuit for displaying said variable delay time.

13. The receiver delay module according to claim 10 further comprising a variable delay selector coupled to said variable delay circuit for allowing a user to manually adjust said variable delay time.

14. The receiver delay module according to claim 13 wherein said variable delay selector includes an analog input.

15. The receiver delay module according to claim 13 wherein said variable delay selector includes a digital input.

16. The receiver delay module according to claim 10 further comprising:
a memory coupled to said variable delay circuit for storing a plurality of variable delay times; and
a plurality of preset buttons coupled to said memory, said plurality of preset buttons corresponding to said plurality of variable delay times.

17. The receiver delay module according to claim 10 further comprising a variable delay time switch coupled to said variable delay circuit.

18. The receiver delay module according to claim 10 wherein said external audio and video receiver includes a television.

19. A radio comprising:
means for receiving an audio signal;
means for delaying said audio signal by a variable delay time; and
means for manually adjusting said variable delay time to synchronize audio from said delayed audio signal with a video signal corresponding to video displayed from an external audio and video receiver, wherein the audio signals are received by the means for receiving prior to the video signal being received by the external audio and video receiver.

20. A method for utilizing a radio comprising:
receiving an incoming audio signal by the radio; and
adjusting a variable delay time of the incoming audio signal to produce a delayed audio signal such that the delayed audio signal is synchronized with a video signal corresponding to video displayed from an external audio and video receiver, wherein the incoming audio signal is received by the radio prior to the video signal being received by the external audio and video receiver.

21. A receiver adapted to output audible sounds, the receiver comprising:
circuitry to receive audio signals via an air medium;
circuitry adapted to temporarily store said audio signals and output a sound signal corresponding to said received audio signal after a delayed amount of time; and
circuitry adapted to variably adjust said delay amount of time a desired amount to synchronize said output sound signal with a video signal received by an external video receiver, wherein the external video receiver displays video corresponding to the received video signal, wherein the audio signals are received by the circuitry to receive prior to the video signal being received by the external video receiver.

* * * * *